Patented Oct. 10, 1933

1,930,274

UNITED STATES PATENT OFFICE 1,930,274

INSULATING COMPOUND

Archie R. Kemp, Westwood, and John H. Ingmanson, Bloomfield, N. J., assignors to Bell Telephone Laboratories, Incorporated, New York, N. Y., a corporation of New York No Drawing. Application November 26, 1930
Serial No. 498,507

2 Claims. (Cl. 18—50)

The present invention relates to anti-oxidants or preservatives for thermoplastic submarine cable insulating materials.

An object of the invention is to preserve submarine cable thermoplastic insulating materials against deterioration during manufacture, application to the cable, during storage of the cable and after laying.

A further object is to preserve thermoplastic insulating compositions against deterioration or oxidization without impairing their electrical, mechanical or thermoplastic properties.

A particular object is to provide compositions of matter containing deproteinized rubber with or without admixtures of balata, gutta percha, hydrocarbon waxes, or other waxes with anti-oxidants to provide oxidization resisting insulating materials suitable for use on communication cables, especially long deep sea telephone cables, requiring insulation of superior electrical properties.

A feature of the invention relates to the production of unvulcanized admixtures of rubber, balata, gutta percha and hydrocarbon waxes with anti-oxidants to provide oxidation resisting insulation materials suitable for use on deep sea communication cables.

The addition of anti-oxidants, for example, tannic acid, to certain thermoplastic insulating materials has heretofore been proposed.

In accordance with the present invention an investigation of anti-oxidants has been made for the purpose of discovering which, if any, of them were suitable for thermoplastic cable insulation. It has been discovered that certain anti-oxidants suitable for other purposes are unsuitable for cable insulation and in particular, unsuitable for preserving compositions including deproteinized rubber. Tannic acid, in particular, is not suitable for use in such compositions because it is soluble in water and for other reasons.

An outline of a series of investigations leading to this discovery is as follows:

A composition consisting of 45% deresinated balata, 45% rubber deproteinized in the latex form as described in U. S. application of Kemp, Serial No. 215,235, filed August 24, 1927, and British Patent No. 307,966, filed December 15, 1927, and 10% of hydrocarbon wax derived from petroleum and having a melting point between 71° C. and 77° C. was first prepared. This composition contained the natural resin of the rubber and about 1% of the resin of the balata. This and similar compositions have been proposed for use in the unvulcanized form, it being known that such compositions after vulcanization lose their thermoplasticity and as a result, cannot conveniently be applied to conductors by extrusion. Sheets of this composition which had been stored under water were washed, cleaned on their surfaces and dried. Samples of them were masticated preliminarily for three minutes and each then mixed with 1% by weight of various commercial anti-oxidants and again masticated for fifteen minutes. Check sheets, for comparison purposes, having no anti-oxidant added thereto were treated in a similar manner. All the samples were then prepared in sheets of about .055 inch (1.4 millimeters) thick and then dried. They were given an accelerated aging treatment. This consisted in suspending the sheets vertically in a "Freas" oven maintained at a temperature of 37.6° C.±.5° C. for fourteen days. A "Freas" oven is a typical example of constant temperature ovens having a free access of air. The justification for drawing conclusions based upon this accelerated aging or oxidizing treatment consists in the fact that it has been shown to produce effects upon insulating compositions of the type in question similar to the effects produced by long exposure to oxidation in salt water under actual conditions of use. Duplicate sheets were preserved in 3.5% sodium chloride solution in the absence of light from the time of preparation until employed for tests of tensile strength as hereinafter mentioned.

Tests of tensile strength and elongation were made of the samples both before and after the aging treatment. A number of the anti-oxidants were eliminated from further consideration because the samples containing them showed a notable loss in tensile strength and in percentage of elongation after aging. In one instance, for example, the tensile strength fell to about one-fourth of its original value and the percentage of elongation before breaking fell to about one-seventh of its value as compared with samples containing other anti-oxidants. The same containing no anti-oxidant fell considerably in tensile strength and elongation.

Certain samples were considerably changed as to their plasticity thus indicating that the anti-oxidants employed with them were unsuitable for the intended purpose.

The electrical properties of the various specimens were investigated. A number of the samples showed such deterioration in this respect that the anti-oxidants employed in them were considered to be unsuitable. Specimens containing tannic acid, for example, had a specific conductance and a value of $\frac{G}{C}$ over twice as great on the average as in the case of the materials having no anti-oxidant added. Other samples also had unfavorable values of specific conductance, and/or values of $\frac{G}{C}$. All capacity and specific conductance measurements herein referred to are effective values at 1,000 cycles per second.

An investigation of the solubility of the various anti-oxidants was made and it was found that they varied widely in solubility. Tannic acid was found to be highly soluble whereas another anti-oxidant (aldol-alpha-naphthylamine) had a solubility of .0036 gram per 100 cc. of water at 25° C. There are good reasons for believing that soluble materials present in submarine cable insulation would go into solution in the surrounding water instead of remaining in the insulation, consequently it is not thought that soluble anti-oxidants are likely to be satisfactory. Furthermore, it is definitely known from previous researches that rubber insulation is more satisfactory in proportion as the water soluble materials are reduced in amount and there is evidence that this is true with other insulating compositions, especially those containing rubber.

One anti-oxidant material indicated as suitable for the intended purpose is phenyl-beta-naphthylamine. Its water solubility is small. The tensile strength of the samples containing it was 1800 lbs. per square inch as compared to 1325 for the blank; the percentage of elongation was 460, almost the same as the blank; the tensile strength after aging was 1430 as compared to 600 for the blank and the percentage of elongation was 440 as compared to 220 for the blank. Its effect upon the plasticity was small. The specific conductance was 0.69 as compared to a value of 0.51 for the blank. The value of the dielectric constant K was 2.10 as compared to the value of 2.19 for the blank. The value of $\frac{G}{C}$ was 3.7 as compared to the value of 2.6 for the blank. The insulation resistance was apparently improved by the use of the anti-oxidant.

Phenyl-beta-naphthylamine is typical of the class of aryl-substituted beta-naphthylamines which, from general theoretical considerations, should give similar results.

Other anti-oxidant materials giving results apparently satisfactory from the standpoint of insulation for long deep sea communication cables were:

(a) Aldol-alpha-naphthylamine, commonly sold under the trade name "Age-Rite Resin".

(b) Symmetrical di-beta-naphthyl-para-phenylene-diamine, commonly sold under the trade name "Age-Rite White".

(c) Diphenyl-ethylene-diamine, commonly sold under the trade name "Stabilite."

(d) Acetaldehyde-ethylene-diamine, commonly sold under the trade name "V. G. B."

None of these materials had a noticeably detrimental effect on the plasticity of the composition and none of them were found to be soluble to an extent greater than .0072 gram per 100 cc. of water at 25° C. The average properties of the insulating materials containing them in comparison with the average of blank samples may be tabulated as follows:

| Materials | Tensile strength before aging lbs. per sq. in. | Elongation percent before aging | Tensile strength after aging lbs. per sq. in. | Elongation percent after aging | Specific conductance mhos/cm$^3 \times 10^{-12}$ at 1000 cycles | K | $\frac{G}{C}$ | Insulation resistance megohms $\times 10^7$ |
|---|---|---|---|---|---|---|---|---|
| (a) | 1700 | 475 | 1500 | 460 | .69 | 2.24 | 3.49 | 1.2 |
| (b) | 1780 | 490 | 1400 | 440 | .71 | 2.24 | 3.63 | 0.60 |
| (c) | 1450 | 460 | 1600 | 480 | .60 | 2.20 | 2.93 | 0.60 |
| (d) | 1490 | 465 | 1300 | 435 | .47 | 2.06 | 2.59 | 1.2 |
| Blank | 1325 | 450 | 600 | 220 | .51 | 2.19 | 2.62 | >1.2 |

Another group of anti-oxidants found to be suitable is aryl-substituted alpha-naphthylamines of which phenyl-alpha-naphthylamine is a typical example.

Two of the anti-oxidants tested were found to give results relatively inferior from the standpoint of electrical properties, but had such a pronouncedly beneficial effect upon the mechanical properties of the insulation that their use is indicated for preserving thermoplastic compositions of the kind under investigation when employed out of water, for example, in air, or in situations or for uses where the very best electrical properties are not required. One such anti-oxidant comprises a mixture of organic bases and beta-naphthol, commonly sold under the trade name "Albasan". The tensile strength of the composition including this anti-oxidant was 1950 lbs. per square inch and the percentage of elongation 485 as compared to 600 lbs. per square inch and 220% for the blank. This anti-oxidant caused the specific conductance of the insulating composition to be increased about six times and the value of $\frac{G}{C}$ about six times as compared with the blank samples. Although not suitable for submarine cables of the best type this material is nevertheless a remarkably good insulation for many purposes.

Other specimens containing, as an anti-oxidant, unsymmetrical diamino-diphenyl-amine, sold under the trade name "Oxynone" had a tensile strength of 2000 lbs. per square inch and a percentage of elongation of 480 after aging. It gave a material with specific conductance and $\frac{C}{G}$ increased about three times.

As a result of researches including those outlined above, it has been discovered that certain anti-oxidants are markedly superior to others for preserving plastic compositions of the type including deproteinized rubber, gutta percha and/or balata as submarine cable insulation, also that certain anti-oxidants do not impair the electrical, mechanical or thermoplastic properties of thermoplastic insulating materials whereas others impair one or more of these properties. There have been provided, for technical use, compositions including deproteinized rubber along with other thermoplastic ingredients, such as balata and waxes, which are markedly less subject to oxidation during manufacture, application and use than materials heretofore employed. These materials, after aging, also have mechanical, electrical and thermoplastic properties not appreciably inferior to the properties of those heretofore employed before aging. The bad effects of aging or oxidation during the necessary working operations incident to manufacture and preparation of the material have also been greatly reduced.

What is claimed is:

1. A composition of matter having the mechanical, thermoplastic and electrical properties necessary for a long deep sea signaling cable consisting at least 80% of materials selected from the group gutta percha, balata and rubber, at least one-half of such 80% being rubber, said composition immediately upon admixture for use in the unvulcanized form having included therein a small amount of diphenyl-ethylene-diamine.

2. A composition otherwise in accordance with claim 1 in which the rubber constituent is deproteinized.

ARCHIE R. KEMP.
JOHN H. INGMANSON.